United States Patent [19]

Verbeke et al.

[11] Patent Number: 5,072,224

[45] Date of Patent: Dec. 10, 1991

[54] MONOPULSE PROCESSING SYSTEMS

[75] Inventors: Charles E. Verbeke, Huntington; Stephen H. Neuman, East Northport; Martin T. Horstman, Jr., Shirley; Carl Schwab, Huntington Station, all of N.Y.

[73] Assignee: Cardion Electronics, Inc., Woodbury, N.Y.

[21] Appl. No.: 546,728

[22] Filed: Jul. 2, 1990

[51] Int. Cl.$^5$ .................. G01S 13/42; G01S 13/74
[52] U.S. Cl. .................. 342/152; 342/37; 342/149; 342/427
[58] Field of Search .................. 342/152, 32, 37, 38, 342/149, 427

[56] References Cited

U.S. PATENT DOCUMENTS 4,334,224  6/1982  Gordon .................. 342/37
4,418,349  11/1983  Höfgen et al. .................. 342/37
4,689,623  8/1987  Schwab et al. .................. 342/39

Primary Examiner—Thomas H. Tarcza
Assistant Examiner—John B. Sotomayor
Attorney, Agent, or Firm—Ailes, Ohlandt & Greeley

[57] ABSTRACT

A secondary surveillance radar system in which monopulse processing is used to obtain angle estimation of azimuth bearing, the improvement residing in a precision method, involving a monopulse qualifier signal, for identifying the maximum unambiguous off-boresight azimuth (OBA), while ensuring reduced sensitivity to Omni channel variations; the monopulse qualifier signal is developed from coherently combining the IF limited signals derived from the Sum+JDelta and Delta+j-Sum signals, such that two amplitude varying signals are created, such signals bearing a direct relationship to the Sum and Difference antenna pattern ratios and being independent of antenna signal power.

9 Claims, 3 Drawing Sheets

RSLS/MONOPULSE QUALIFIER OPERATION

MONOPULSE QUALIFIER

RSLS PASS

PROCESSING ZONE

DEGREES OFF BORESIGHT

MONOPULSE PROCESSING SYSTEMS

BACKGROUND OF THE INVENTION

This invention relates to the field of secondary surveillance radar (SSR) systems, which are systems designed to operate in conjunction with primary radar for precisely locating aircraft by transmitting information to them and processing their replies. More particularly, this invention relates to an SSR system in which monopulse processing is used to obtain superior angle estimation of azimuth bearings of aircraft.

By monopulse processing is meant techniques which determine aircraft azimuths on a pulse-by-pulse basis so as to permit highly accurate azimuth estimates to be made on a single reply per scan. These techniques permit a very high degree of accuracy in determining azimuth. Moreover, monopulse techniques permit secondary surveillance radar operation at a greatly reduced pulse repetition frequency compared to that required by more conventional azimuth measurement techniques.

The present invention is an improvement on systems described in U.S. Pat. No. 4,689,623, assigned to the assignee of the present invention. For a complete background on pertinent radar systems, reference may be made to a number of references cited in U.S. Pat. No. 4,689,623. While it will be appreciated that these known systems have various merits and advantages, they do not provide a completely efficient, relatively simple and cost effective SSR system.

Although the system described in the aforenoted U.S. Pat. No. 4,689,623 is considered reasonably cost effective, it has been found to have certain limitations. For example, it does not provide a sufficiently bounded identification of the maximum unambiguous off-boresight azimuth (OBA) and, at the same time, reduce sensitivity to Omni channel variations. Stated another way, excessive Omni channel signal variations will permit the Omni channel to exert an undesired RSLS gate action (possible erroneous RSLS suppression).

SUMMARY OF THE INVENTION

Accordingly, it is a primary object of the present invention to provide a precision method; that is, one which will provide a sufficiently bounded identification of the maximum unambiguous off-boresight azimuth, while ensuring a reduced sensitivity to Omni channel variations. By contrast, other known systems suffer from their disability to provide constant beamwidth operation.

A further object of the present invention is to enable additional pulse processing of the Sum and Difference antenna pattern relationship over the principal beam width; nominally twice the −3 dB bandwidth, thereby to ensure a constant target azimuth beam width independent of target range.

In fulfillment of the above stated and other objects, improvement is realized over conventional receiver side lobe suppression (RSLS) techniques using only the Omni channel. This improvement is achieved by the use of what is called a "monopulse qualifier signal", to be described later in detail. Such monopulse qualifier signal is used inside the principal beam, while the Omni antenna is employed outside the principal beam. Consequently, there is coverage of the processing channel side lobes, yet better discrimination is provided within the main beam.

A specific feature of the invention resides in the application of the aforenoted monopulse qualifier signal, which is developed by coherently combining IF limited signals which have been derived from first and second signals which result from an arrangement in the system whereby such first and second signals are of equal magnitude but differ in phase in the respective channels, the first signal being Sum +j Delta, the second signal being Delta +j Sum. The result of combining the aforenoted IF limited signals is that two amplitude-varying signals are created. These signals bear a direct relationship to the Sum and Difference antenna pattern ratios and are independent of antenna signal power. The amplitude of these two signals is then compared to develop the monopulse qualifier output signal.

Viewed as an entire combination, the present invention, briefly stated, is a secondary surveillance radar system in which monopulse processing is used to obtain angle estimation azimuth bearing, the system comprising: at least three channels, one of which is a Sum channel, the second a Difference channel, and the third an Omni channel; means for providing first and second signals of equal magnitude, but differing in phase, in respective channels, the first signal being Delta+j Sum, the second signal being Sum+j Delta; a log amplifier in each of the respective channels; a monopulse processor; two independent phase detectors for detecting said first and second signals in the respective channels; means for coupling the outputs of the respective phase detectors to said processor; and means for providing a sufficiently bounded identification of the maximum unambiguous off-boresight azimuth with a reduced sensitivity to signal variations in said Omni channel, said means for providing being coupled to said log amplifiers in the respective channels. The system can further include means for coupling the outputs of said log amplifiers in said respective channels to their respective phase detectors, whereby a resultant signal is obtained the magnitude of which gives target deviation in either direction from boresight based on the phase difference between said first and second signals.

Other and further objects, advantages and features of the present invention will be understood by reference to the following specification in conjunction with the annexed drawing, wherein like parts have been given like numbers.

DESCRIPTION OF PREFERRED EMBODIMENT

Figure 1:
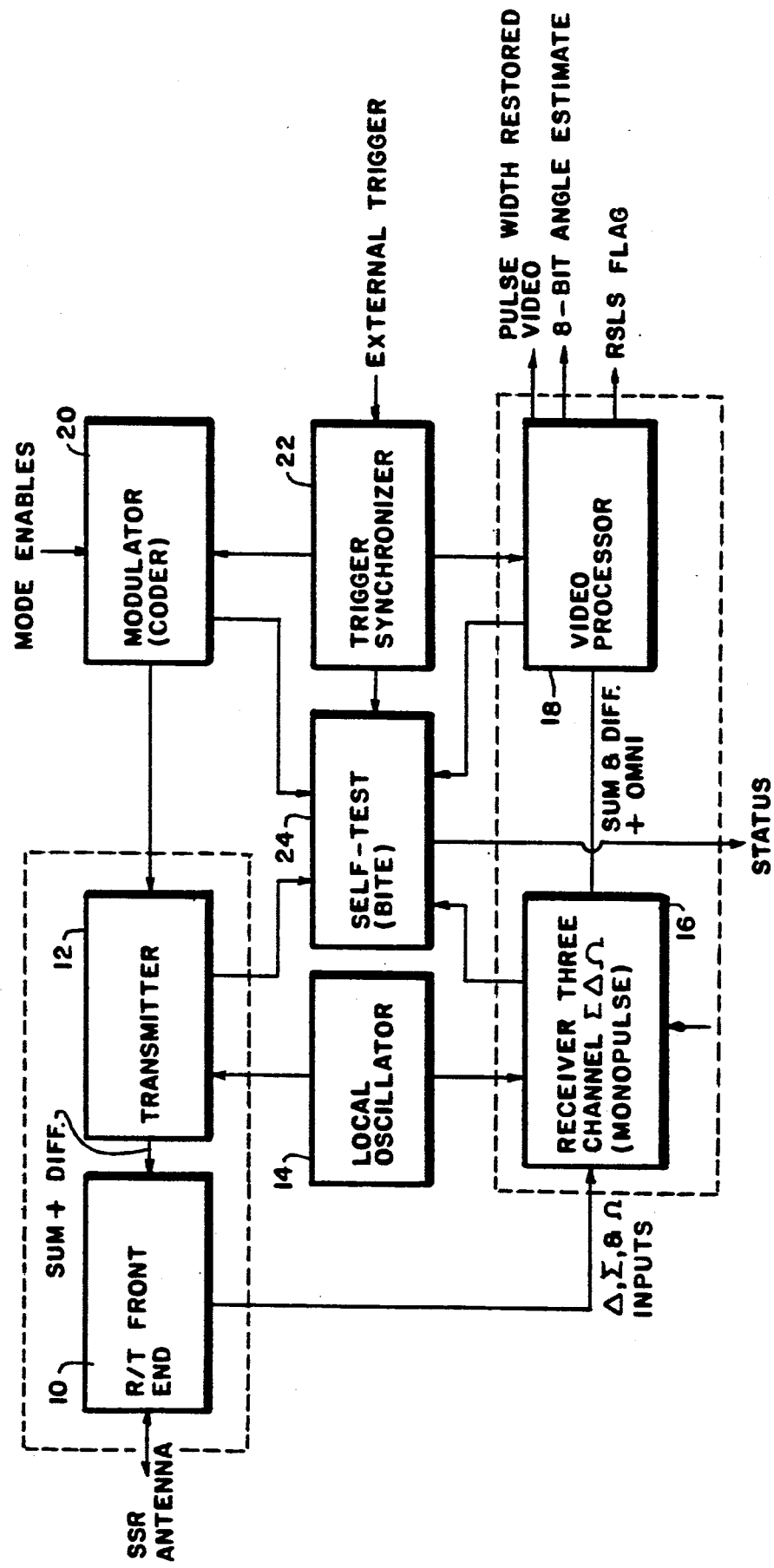
FIG. 1 is a block diagram of the context or environment in which the present invention functions. Such environment is an interrogator set which includes both a receiver and transmitter and suitable controls for operating same.

Referring now to the figures of the system in which a preferred embodiment of the present invention is disclosed, and particularly for the moment to FIG. 1, there will be seen a simplified block or functional diagram of a so-called interrogator set comprising a receiver and transmitter front end 10, a dual function solid state transmitter 12, a local oscillator 14, and a three channel receiver 16 consisting of three substantially identical receiver channels. Also included as part of this set is a video monopulse processor 18, a coder or modulator 20, an internal trigger synchronizer 22, and a self-test device 24.

The complete interrogator set generates and transmits two interrogation signals, the Sum (Sigma) and the Omni (Omega) signal. It receives three transponder reply signals, Sum (Sigma), Difference (Delta), and Omni (Omega) as indicated at the input to the receiver 16. These three transponder replies are of course received from the aircraft location that is being monitored.

It will be understood that the product of all the system functions is one digital word (seven bits plus sign) for angle estimate (off-boresight); one pulse width restored video, and a receiver side lobe suppression flag seen in FIG. 1 at the output of the video processor 18.

The interrogator set seen in FIG. 1 is, per se, well known and it is a self-contained powered unit for operation in single and dual channel SSR systems. Such an interrogator system normally operates in conjunction with the primary radar of the air traffic control facility, providing identification information and altitude position of aircraft equipped with appropriate transponders. Interrogations are made on the crystal controlled frequency of 1,030 MHz; all transponder replies are received on a frequency of 1,090 and are processed into video signals suitable for reply decoding, identification, and display.

Figure 2:
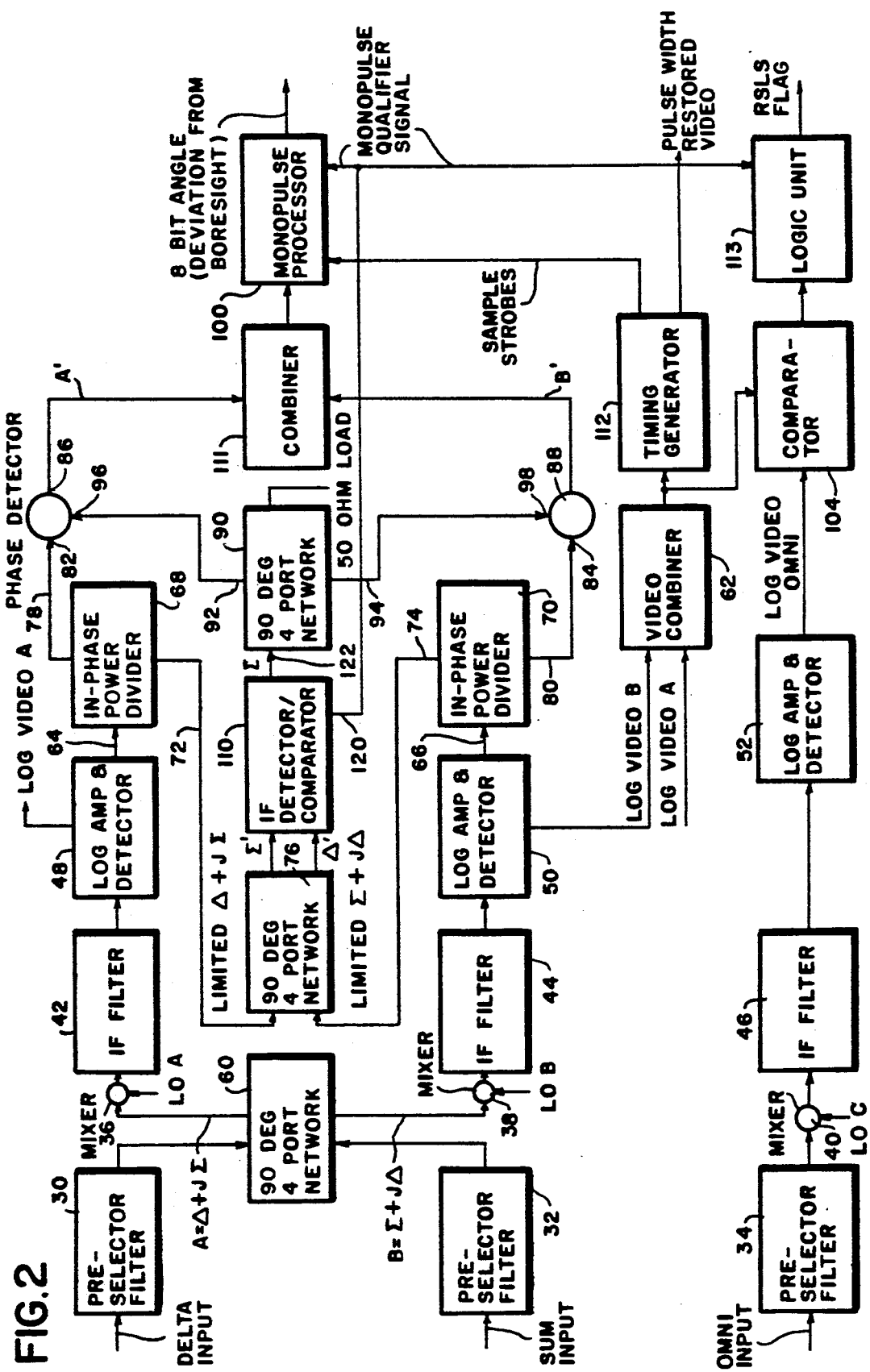
FIG. 2 is a block diagram of the unique secondary surveillance radar (SSR) system in which monopulse processing is used in the receiver to obtain angle estimation of azimuth bearing of aircraft based on replies from the aircraft.
Figure 3A:
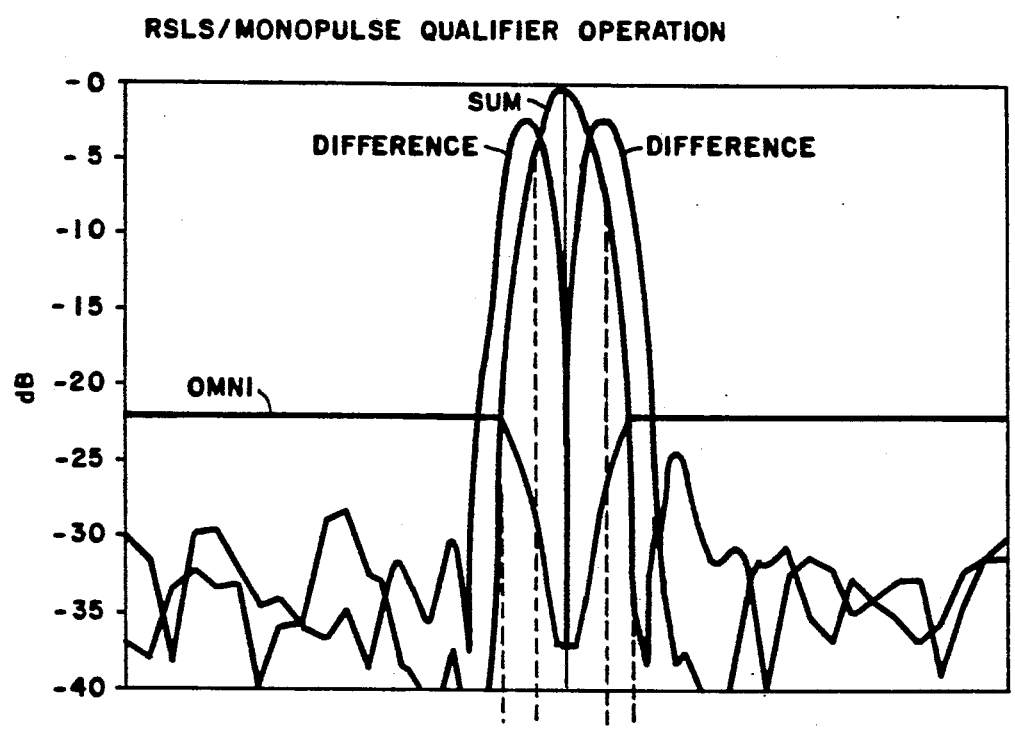
FIG. 3 is a graph depicting antenna patterns and monopulse qualifier waveforms for a typical monopulse system.
Figure 3B:
Figure 3C:
Figure 3D:

The uniqueness of the system of the present invention may be appreciated by reference to FIG. 2, in which the details of the circuitry of the three channel receiver 16 and the video processor 18 of the present system are seen. The monopulse receiver 16 includes three separate channels. At the input to the upper channel there is provided a Difference or Delta input, to the next lower channel a Sum or Sigma input, and to the bottom channel an Omni input, all of which are provided from the secondary surveillance radar antenna or antennas.

Included in the three channels are preselector filters 30, 32, and 34 respectively, and mixers 36, 38, and 40 respectively. Also seen at subsequent stages are transitional Gaussian to 6 dB filters 42, 44, 46 respectively and log amplifiers/detectors 48, 50, and 52 respectively.

It will be understood that the three signals of the 1,090 MHz carrier frequency are made available to the respective receiver channels, that is, the Sum, Difference, and Omni channels. These modulated signals are processed by the preselector filters 30, 32, and 34 to enable transponder replies but to suppress 1,030 MHz interrogations. It will be seen that both the Sum and Difference signals received from the antenna are applied to the 90 degree four-port network 60. The two resulting outputs are denominated A and B signals, being in the form Delta+jSum and Sum+jDelta, the absolute values of which are always equal when Sum and Delta are properly phased. However, it will be recalled that although these two signals will have the same magnitude, they will differ in phase depending on target deviation from boresight. A local oscillator, designated LO, has three isolated output signals of the same phase, designated A, B, and C, which are applied to the respective mixers 36, 38, and 40 in the receiver channels to the produce the converted, 60 MHz intermediate frequency (IF) signals.

Transitional Gaussian to 6 dB filters 42, 44, and 46 are used for the IF bandpass function. Such filters are used because of their normally flat time delay pass band response without sacrificing the required attenuation in the stop band. The log amplifier/detector devices 48, 50, and 52 in the respective channels are connected to the output of the Gaussian to 6 dB filters. Each log amplifier has an overall gain of at least 72 dB with the linear portion of the log slope extending over at least 60 dB.

Each of the log amplifiers 48 and 50 provides a log video signal (A or B respectively) which are supplied to the video combiner device 62 seen at the lower right in FIG. 2. These respective outputs are designated log video A for log amplifier 48 and log video B for log amplifier 50. Log amplifier/detector 52 provides an output log video Omni which is connected to an input of comparator 104. This comparator compares the log video Omni signal with the output signal resulting from the combining of log video A with log video B. The output of comparator 104 is transmitted to logic unit 113, from which an RSLS flag signal is transmitted to provide suppression in the event certain criteria are met; namely, RSLS outside the principal beam; and OBA or monopulse qualifier within the beam.

In addition to the log video output signals just discussed, limited carrier signals, that is, amplitude limited, 60 MHz IF signals, are supplied by way of the connections 64 and 66 at the other output of the respective log amplifiers 48 and 50 to the in-phase power dividers 68 and 70 respectively in the A and B channels.

It will be noted that each signal in the inphase power dividers 68 and 70 is split into two −3 dB signals in these power dividers: one −3 dB signal is furnished by way of suitable output connections 72 and 74 respectively to another 90 degree, four port network (hybrid) 76. The other −3 dB signal is fed from the respective in-phase power dividers 68 and 70, and by way of the respective output connections 78 and 80, to inputs 82 and 84 of the respective phase detectors 86 and 88. The output of the network 76 is fed or coupled to yet another 90 degree, four port network 90. However, it is to be noted that this coupling is through a specially provided device 110 which comprises an IF detector and comparator.

In accordance with the present invention, this device 110 provides a monopulse qualifier signal which is transmitted by output connection 120 (which is bifurcated such that connections are extended to both the monopulse processor 100 and to the logic unit 113). The operation of this part of the circuit will be explained in some detail hereinafter.

The device 110 has another output connection 122 which extends to another four-port network 90, which is provided with output connections 92 and 94 to additional inputs 96 and 98 to the respective phase detectors 86 and 88. This quadrature hybrid 90 has one of its ports terminated in a 50 ohm load, as will be seen. It will thus be appreciated that there are two outputs of device 110: first, a Sum (Sigma) reference signal fed to quadrature hybrid 90 and second, a monopulse qualifier output signal applied via connector 120 to monopulse processor 100 and to logic unit 113 as already noted.

It will be appreciated that the combination of the two phase detector signals A' and B' appearing at the respective outputs of phase detectors 86 and 88 provides an accurate measure of angular deviation from boresight. A' is positive and B' negative, responsive to deviations to the left of boresight, while A' is negative but B' positive with deviations to the right of boresight. Both the A' and B' signal levels are combined in the monopulse combiner 111 to produce a single voltage level of positive or negative polarity, thereby providing the total value of deviation from boresight. The single voltage level is quantized into an eight-bit word (seven bits for magnitude and one bit for sign) using signal timing strobes from timing generator 112. The eight-bit quantized signal is taken from the output of the monopulse processor 100 and made available to the angle processor of a plot extractor device (not shown).

As noted before, the log video A and log video B signals from the respective log amplifiers 48 and 50 are combined in a device 62. The resulting signal amplitude is output to the timing generator 112; and is also compared by means of a comparator 104 with the amplitude of the log video signal from the Omni channel. It will be understood that for Omni signal values that are larger than the combined log video A and B signals by a threshold value, a condition for receiver side lobe suppression (RSLS) is established. Logic unit or device 113 further combines the resultant signal from the comparator 104 with the monopulse qualifier signal received by way of the connection 120 from device 110. Thus, the resultant signal from this unit or device 113 effectively serves as another condition for invoking RSLS; that is to say, the logic is such that in either case the RSLS flag is created, which is used by circuits in the plot extractor device, previously mentioned but not shown.

Referring now to FIG. 3, there is shown an antenna pattern involving the principles of the present invention. In this plot, degrees off boresight (X axis) is plotted against signal levels in dB (Y axis) for the Sum, Difference, and Omni channel signals. This graphical presentation is helpful in understanding the application of the present invention to secondary surveillance radar.

It will be noted that FIG. 3 is effectively a "blowup" of a plot that is taken over a full plus or minus 20 degrees. Below the pattern plot, the individual areas of monopulse qualification operation and RSLS operation are indicated. The combination (ANDing) of these two operations creates the "processing zone" signal shown. This signal is used to create the area of RSLS FLAG operation within the system. It can be seen from the plots that the monopulse qualifier and RSLS Pass signal each have particular areas of operation and that both are required for proper operation.

It will be appreciated that the monopulse qualifier is required for the zone around boresight in order to provide the "beam sharpening" effect. However, the monopulse qualifier process operates from the IF limited signals and will therefore have other (incorrect) areas of qualification outside the principal beam (indicated by the monopulse qualifier returning to a "high" logic level at approximately +/− 5 degrees off boresight). It will further be appreciated that the RSLS pass operation will have to "take over" in these areas since it operates from the input power level difference between the processing channel and the Omni channel. Hence, RSLS pass is only in the pass state near the boresight but has a wider azimuth width than the monopulse qualifier area. The "width" of the RSLS pass zone is controllable by adjusting the RSLS "K" factor within the interrogator. This allows for flexibility of operation with other antenna types.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

We claim:

1. A secondary surveillance radar system in which monopulse processing is used to obtain angle estimation of azimuth bearing, said system comprising:
   at least three channels, one of which is a Sum channel, the second a Delta channel, and the third an Omni channel;
   means for providing first and second signals of equal magnitude, but differing in phase, in respective channels, the first signal being Sum+jDelta, the second signal being Delta+jSum, wherein j is the square root of;
   a log amplifier in each of the respective channels;
   a monopulse processor;
   two independent phase detectors for detecting said first and second signals in the respective channels;
   means for coupling the outputs of the respective phase detectors to said monopulse processor; and
   means for providing a sufficiently bounded identification of the maximum unambiguous off-boresight azimuth with reduced sensitivity to signal variations in said Omni channel, said means for providing being coupled to said log amplifiers in the respective channels.

2. The system as defined in claim 1, in which said means for providing includes means for coherently combining IF limited signals derived from said first and second signals respectively, such that two amplitude-varying signals result, such signals bearing a direct relationship to the sum and delta antenna pattern ratios; and
   further including means for comparing said amplitude-varying signals to provide a monopulse qualifier signal, and means for connecting said monopulse qualifier signal to said monopulse processor and to the output of said Omni channel.

3. A system as defined in claim 1, further comprising:
   a logic unit or device;
   a comparator for comparing a log video Omni signal with a signal resulting from combining a log video A signal from an output of said log amplifier in said one respective channel and a log video B signal from an output of said log amplifier in said second respective channel, thereby to produce an output signal for connection to said logic unit;
   means for connecting the monopulse qualifier signal to said logic device, the logic device serving to combine the output signal from said comparator with said monopulse qualifier signal to produce a flag signal for selectively suppressing side lobe patterns.

4. A secondary surveillance radar system in which monopulse processing is used to obtain angle estimation of azimuth bearing, said system comprising:
   at least three channels, one of which is a Sum channel, the second a Delta channel, and the third an Omni channel;
   means for providing first and second signals of equal magnitude, but differing in phase, in respective channels, the first signal being Sum+jDelta, the second signal being Delta+jSum, wherein j is the square root of;

a log amplifier in each of the respective channels, each of said log amplifiers having first and second outputs;
a monopulse processor;
two independent phase detectors for detecting said first and second signals in the respective channels;
means for coupling the outputs of the respective phase detectors to said monopulse processor;
means for coupling the first outputs of said log amplifiers in said respective channels to their respective phase detectors, whereby a resultant signal is obtained, the magnitude of which gives target deviation in either direction from boresight based on the phase difference between said first and second signals; and
means for providing a sufficiently bounded identification of the maximum unambiguous off-boresight azimuth with reduced sensitivity to signal variations in said Omni channel, said means for providing also being coupled to the first outputs of said log amplifiers in the respective channels.

5. The system as defined in claim 4, in which said means for providing includes means for coherently combining IF limited signals derived from said first and second signals respectively, such that two amplitude-varying signals result, such signals bearing a direct relationship to the sum and delta antenna pattern ratios; and further including means for comparing said amplitude-varying signals to provide a monopulse qualifier signal, and means for connecting said monopulse qualifier signal to said monopulse processor and to the output of said Omni channel.

6. A system as defined in claim 4, further comprising:
a logic unit or device;
a comparator for comparing a log video Omni signal with a signal resulting from combining a log video A signal from an output of said log amplifier in said one respective channel and a log video B signal from an output of said log amplifier in said second respective channel, thereby to produce an output signal for connection to said logic unit;
means for connecting the monopulse qualifier signal to said logic device, the logic device serving to combine the output signal from said comparator with said monopulse qualifier signal to produce a flag signal for selectively suppressing side lobe patterns.

7. A system as defined in claim 4, in which said means for coupling the first outputs of said log amplifiers in said respective channels to said respective phase detectors includes a 90 degree, four-port network, the first output of each of said log amplifiers being coupled to respective inputs of said network.

8. A system as defined in claim 7, in which said means for coupling the first outputs of said log amplifiers to the phase detectors further includes an in-phase power divider connected between each of said log amplifiers and said four-port network, said divider also being connected between said log amplifiers and another respective input of each of said phase detectors.

9. A system as defined in claim 8, further including a video combiner for combining the log video A signal and the log video B signal from the second outputs of said respective log amplifiers.

* * * * *